(12) United States Patent
Hannah

(10) Patent No.: US 11,524,238 B1
(45) Date of Patent: Dec. 13, 2022

(54) AUGMENTED REALITY TAG RECOGNITION AND GAME MINIATURE IDENTIFICATION SYSTEM AND PROCESS FOR UNIQUELY IDENTIFYING GAME MINIATURES CORRESPONDING TO CHARACTER ATTRIBUTES IN A ROLE

(71) Applicant: Kevin Neil Hannah, Littleton, CO (US)

(72) Inventor: Kevin Neil Hannah, Littleton, CO (US)

(*) Notice: Subject to any disclaimer, the term of this patent is extended or adjusted under 35 U.S.C. 154(b) by 0 days.

(21) Appl. No.: 17/227,188

(22) Filed: Apr. 9, 2021

(51) Int. Cl.
*A63F 13/58* (2014.01)
*A63F 13/65* (2014.01)

(52) U.S. Cl.
CPC ............ *A63F 13/65* (2014.09); *A63F 13/58* (2014.09)

(58) Field of Classification Search
CPC .......... A63F 13/20; A63F 13/21; A63F 13/50; A63F 13/55; A63F 13/58; A63F 13/63; A63F 13/65; A63F 13/69; A63F 13/70; A63F 13/77; A63F 13/822; A63F 13/825; A63F 2300/6036; A63F 2300/609; A63F 2300/66; G06T 19/00
See application file for complete search history.

(56) References Cited

U.S. PATENT DOCUMENTS

| | | | |
|---|---|---|---|
| 9,028,315 B2 | 5/2015 | Morichau-Beauchant et al. | |
| 10,424,123 B2 | 9/2019 | Sudol et al. | |
| 10,549,209 B2 | 2/2020 | Muthyala et al. | |
| 2017/0225073 A1* | 8/2017 | Laulund | A63F 13/65 |

* cited by examiner

*Primary Examiner* — Omkar A Deodhar
(74) *Attorney, Agent, or Firm* — Plager Schack LLP; Mark H. Plager; Stephen Hallberg

(57) ABSTRACT

An augmented reality (AR) tag recognition and game miniature identification system is disclosed that uniquely identifies game miniatures and character attributes that correspond to the game miniatures in a tabletop role-playing game. The AR tag recognition and game miniature identification system is used with a physical game miniature base system and involves uses of a marker or tag to uniquely identify game miniatures by way of an AR system. The AR tag recognition and game miniature identification system relies on the simple, cheap, addition of the tag as part of the miniature base to allow for easy visual identification.

7 Claims, 7 Drawing Sheets

AUGMENTED REALITY TAG RECOGNITION AND GAME MINIATURE IDENTIFICATION SYSTEM AND PROCESS FOR UNIQUELY IDENTIFYING GAME MINIATURES CORRESPONDING TO CHARACTER ATTRIBUTES IN A ROLE

BACKGROUND

Embodiments of the invention described in this specification relate generally to game miniatures used in tabletop role-playing games using augmented reality technology, and more particularly, to an augmented reality tag recognition and game miniature identification system that uniquely identifies tag elements ("tags") attached to miniature bases which correspond to particular game miniatures and an AR tag recognition and game miniature identification process for uniquely identifying tags attached to miniature bases which correspond to particular game miniatures used in a tabletop game.

Tabletop role-playing games are played on a tabletop using game miniatures to represent pre-generated characters in the game and map drawings (paper or digital) to represent the environment in which the characters are located. Characters move, take actions, interact with other characters, and interact with the environment, as described by the game players. The outcomes of such movements, actions, interactions, etc., depend on characteristics of the characters, which are written on conventional character sheets and other materials. Conventionally, it is possible that two different players can have the same game miniature represent different characters. For example, one player may use miniature A to represent a pre-generated character in a tabletop role-playing game while a different player may use the same miniature A to represent a different pre-generated character. Conventionally, when the same miniature is used by different players for different characters, players are able to distinguish the miniatures based on variation in physical detail, including how the miniature is painted, or environmental elements added to the base, etc. If and when a player loses a miniature, it is easy to replace the lost miniature with a different one from the original because the characteristics are just manually referenced from written materials. However, these scenarios preclude the actual game miniature itself from providing unique identification to an Augmented Reality (AR) system. Furthermore, existing, conventional bases for game miniatures do not provide any method to support visual recognition of the game miniatures that are attached to the base system by the AR system.

A consistent complaint from players adopting more and more realistic tabletop role-playing game rules is the time and effort to determine outcomes and the detraction this becomes for the flow of storytelling that is at the core of most tabletop role-playing games. By way of an example, Character A played by Player A wants to shoot Character B played by Player B. In order to resolve this encounter, as it is described, the characteristics of Character A are compared with the characteristics of Character B and what, if any, environmental factors would have an impact on the outcome of the game interaction. Conventionally, this is a manual process (without AR), whereby players consult character sheets, reference rule books, perform visual observation, allow for game master (or referee) adjudication, and otherwise conduct manual calculations.

Although an AR system would seem to provide an easy solution to automated outcome determination during game play, the fact is that existing AR systems are not able to recognize the miniatures involved as the characters they represent and the tabletop role-playing games do not provide an existing mechanism to bridge this gap. Use of AR systems then becomes an afterthought since they are not able to currently distinguish between the characters when the same miniature is used by two players who intend the miniature to represent different pre-generated characters.

Therefore, what is needed is a way to identify game miniatures attached to a base system when using an AR system and mobile app in a miniature-based game to provide a fast and automated way to identify game miniature characters, reference the characteristics of the characters, account for environmental and other aspects of game play, and determine outcomes of player movements, actions, and interactions in realtime.

BRIEF DESCRIPTION

A novel augmented reality (AR) tag recognition and game miniature identification system that uniquely identifies game miniatures attached to miniature bases by AR recognition of uniquely identifiable tag elements ("tags") that are attached to the miniature bases and a novel AR tag recognition and game miniature identification process for uniquely identifying game miniatures attached to miniature bases by AR recognition of tags attached to the miniature bases are disclosed. In some embodiments, the AR tag recognition and game miniature identification system and process provides a technological solution for a physical game miniature base system to uniquely identify any game miniature, including two or more same game miniatures with different characteristics, attached to the base system by way of an augmented reality system.

In some embodiments, the AR tag recognition and game miniature identification system comprises a miniature base on which a game miniature is mounted, a tag that includes a tag marker end and a click-fit end that secures the tag to the miniature base by way of a click-fit system that supports interchangeability of tags. In some embodiments, the tag marker end is formed in a particular shape that is recognizable by a visual recognition system of the AR system. In some embodiments, the tag marker end is colored by a particular color that is recognizable by the visual recognition system of the AR system. In some embodiments, a tag is uniquely identifiable by the visual recognition system of the AR system and distinguishable from other tags by a combination of the particular shape and the particular color for the tag marker end of the tag. In some embodiments, a front-facing orientation of a game miniature mounted to the miniature base is related to a position at which the tag attaches to the miniature base. In some embodiments, the front-facing orientation of the game miniature mounted to the miniature base is an orientation that faces the position at which the tag attaches to the miniature base.

In some embodiments, the tag marker end includes a supplemental visual identifier that is positioned along a top exterior surface of the tag marker end. In some embodiments, a tag is uniquely identifiable by the visual recognition system of the AR system and distinguishable from other tags by the supplemental visual identifier placed on the top exterior surface of the tag marker end of the tag. In some embodiments, the supplemental visual identifier includes a marker element comprising one of a sticker, a magnetized element, and an integrated marker. In some embodiments, the supplemental visual identifier includes at least one of a character, a pattern, a code, and a glyph that is recognizable by the visual recognition system of the AR system. In some embodiments, a tag is uniquely identifiable by the visual recognition system of the AR system and distinguishable from other tags by a combination of the supplemental visual identifier and the particular shape of the tag marker end of the tag. In some embodiments, a tag is uniquely identifiable by the visual recognition system of the AR system and distinguishable from other tags by a combination of the supplemental visual identifier and the particular color of the tag marker end of the tag. In some embodiments, a tag is uniquely identifiable by the visual recognition system of the AR system and distinguishable from other tags by a combination of the supplemental visual identifier, the particular shape of the tag marker end of the tag, and the particular color of the tag marker end of the tag.

In some embodiments, the AR tag recognition and physical game miniature base system further comprises a tabletop role-playing game application and a character database. In some embodiments, each tag includes a unique identifier which, by way of an Application Program Interface (API), allows the tag to be mapped to a corresponding character data structure that is stored in the character database in connection with the tabletop role-playing game application. In this way, the tabletop role-playing game application is able to utilize the AR system to visually recognize (via AR tag recognition) each tag, resolve which game miniature equates to which character, determine the front-facing orientation of the game miniature, identify a relative location of the game miniature with respect to other similarly tagged game miniatures, and identify a direction in which the game miniature is facing with respect to the other similarly tagged game miniatures.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
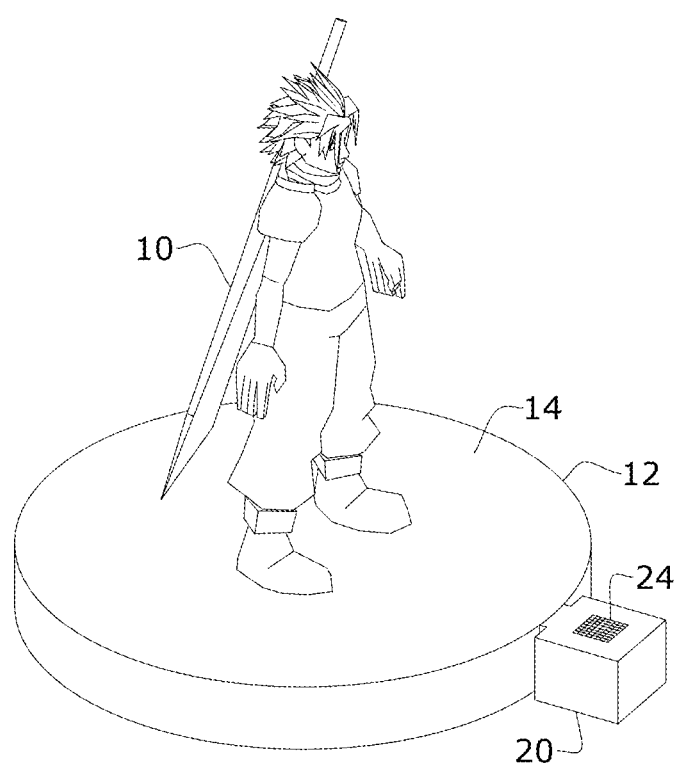
FIG. 1 conceptually illustrates a tag connected to a miniature base used to uniquely identify a game miniature mounted to the miniature base by way of an augmented reality (AR) tag recognition and game miniature identification system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include an augmented reality (AR) tag recognition and game miniature identification system that uniquely identifies game miniatures attached to miniature bases by AR recognition of uniquely identifiable tag elements ("tags") that are attached to the miniature bases and a novel AR tag recognition and game miniature identification process for uniquely identifying game miniatures attached to miniature bases by AR recognition of tags attached to the miniature bases.

In some embodiments, the AR tag recognition and game miniature identification system comprises (i) a miniature base on which a game miniature is mounted and (ii) a tag. In some embodiments, each tag has a shape and a color. In some embodiments, the shape of the tag is one of a circle shape and a particular polygon shape from a plurality of polygon shapes with differing numbers of sides. In some embodiments, the plurality of polygon shapes includes six polygons with differing number of sides. In some embodiments, the plurality of polygon shapes includes a three-sided polygon (triangle), a four-sided polygon (rectangle or square), a five-sided polygon (pentagon), a six-sided polygon (hexagon), a seven-sided polygon (heptagon), and an eight-sided polygon (octagon). In some embodiments, the plurality of polygon shapes includes more than six polygons with differing number of sides.

In some embodiments, the color of the tag is a particular color from a plurality of colors. In some embodiments, the plurality of colors include white, red, orange, yellow, green, blue, indigo, violet, and black.

Each tag includes a tag marker end and a click-fit end that secures the tag to the miniature base by way of a click-fit system that supports interchangeability of tags. In some embodiments, the tag marker end is formed in a particular shape that is recognizable by a visual recognition system of the AR system. In some embodiments, the tag marker end is colored by a particular color that is recognizable by the visual recognition system of the AR system. In some embodiments, a tag is uniquely identifiable by the visual recognition system of the AR system and distinguishable from other tags by a combination of the particular shape and the particular color for the tag marker end of the tag. In some embodiments, a front-facing orientation of a game miniature mounted to the miniature base is related to a position at which the tag attaches to the miniature base. In some embodiments, the front-facing orientation of the game miniature mounted to the miniature base is an orientation that faces the position at which the tag attaches to the miniature base.

In some embodiments, the AR tag recognition and physical game miniature base system comprises a miniature base on which a miniature is mounted, a tag that includes a tag marker end and a click-fit end that secures the tag to the miniature base by way of a click-fit system that supports interchangeability of tags. In some embodiments, the tag marker end is formed in a particular shape that is recognizable by a visual recognition system of the AR system. In some embodiments, the tag marker end is colored by a particular color that is recognizable by the visual recognition system of the AR system. In some embodiments, a tag is uniquely identifiable by the visual recognition system of the AR system and distinguishable from other tags by a combination of the particular shape and the particular color for the tag marker end of the tag. In some embodiments, a front-facing orientation of a miniature mounted to the miniature base is related to a position at which the tag attaches to the miniature base. In some embodiments, the front-facing orientation of the miniature mounted to the miniature base is an orientation that faces the position at which the tag attaches to the miniature base.

In some embodiments, the tag marker end includes a supplemental visual identifier that is positioned along a top exterior surface of the tag marker end. In some embodiments, a tag is uniquely identifiable by the visual recognition system of the AR system and distinguishable from other tags by the supplemental visual identifier placed on the top exterior surface of the tag marker end of the tag. In some embodiments, the supplemental visual identifier comprises a marker element comprising one of a sticker, a magnetized element, and an integrated marker. In some embodiments, the marker element of the supplemental visual identifier positioned along the top exterior surface of the tag marker end comprises the color of the tag. In some embodiments, the supplemental visual identifier includes at least one of the color of the tag, a character, a pattern, a code, and a glyph that is recognizable by the visual recognition system of the AR system. In some embodiments, a tag is uniquely identifiable by the visual recognition system of the AR system and distinguishable from other tags by a combination of the supplemental visual identifier and the particular shape of the tag marker end of the tag. In some embodiments, a tag is uniquely identifiable by the visual recognition system of the AR system and distinguishable from other tags by a combination of the supplemental visual identifier and the particular color of the tag marker end of the tag. In some embodiments, a tag is uniquely identifiable by the visual recognition system of the AR system and distinguishable from other tags by a combination of the supplemental visual identifier, the particular shape of the tag marker end of the tag, and the particular color of the tag marker end of the tag.

In some embodiments, the AR tag recognition and game miniature identification system further comprises a tabletop role-playing game application and a character database. In some embodiments, each tag includes a unique identifier which, by way of an API, allows the tag to be mapped to a corresponding character data structure that is stored in the character database in connection with the tabletop role-playing game application. In this way, the tabletop role-playing game application is able to identify each tag via AR tag recognition, resolve which miniature equates to which character, determine the front-facing orientation of the miniature, identify a relative location of the miniature with respect to other similarly tagged miniatures, and identify a direction in which the miniature is facing with respect to the other similarly tagged miniatures.

By way of example, FIG. 1 conceptually illustrates a visual identifier 24 disposed along a top exterior surface of a tag 20 that is connected to a miniature base 12 and which is used to uniquely identify a game miniature 10 mounted to a top base surface 14 of the miniature base 12 by way of an augmented reality (AR) tag recognition and game miniature identification system. In some embodiments, a player with a camera and computing device running the tabletop role-playing game application can view the game miniature 10 through a screen of the computing device (as captured by the camera) to see characteristics of the pre-generated character associated with the game miniature 10 mounted to the base 12. This is automatic by action of AR recognition performed by the tabletop role-playing game application in realtime when the visual identifier 24 and tag 20 are within a field of view of the camera of the computing device, thereby providing the AR recognition a view of the unique combination of the shape and color (or shape, color, and other marker element). The computing device can be, for example, a mobile device, and the tabletop role-playing game application may be a mobile app running on the mobile device, which connects to the character database to retrieve the characteristics of the identified character associated with the game miniature 10.

As stated above, the use of game miniatures is an essential element of tabletop games and, especially, of tabletop role-playing games. However, variation in physical detail, including how the miniature is painted, or the use of different miniatures for the same purpose, or a player replaces a lost miniature with a different one from the original, preclude the actual game miniature itself from providing unique identification to an AR system. This is because conventional, existing bases for game miniatures do not provide any method to support visual recognition of the game miniatures that are attached to the base system by the AR system. As a result, existing AR systems are not able to recognize the miniatures involved as the characters they represent and the tabletop role-playing games do not provide an existing mechanism to bridge this gap. Use of AR systems then becomes an afterthought since they are not able to currently distinguish between the characters when the same miniature is used by two players who intend the miniature to represent different pre-generated characters. Embodiments of the AR tag recognition and game miniature identification system and process described in this specification solve such problems by providing a way for game miniatures to be singularly identified visually by Augmented Reality systems.

Embodiments of the AR tag recognition and game miniature identification system and process described in this specification differ from and improve upon currently existing options. In particular, other miniature bases from existing tabletop role-playing games do not include any method for singular visual identification of the game miniature to which they are attached by an Augmented Reality system. The existing methods rely on the visual capabilities of the Augmented Reality system which are currently inadequate to visually identify a game miniature. As such, two of the same miniatures used in the same tabletop role-playing game would be indistinguishable to a conventional AR system. Improving the visual acuity of the Augmented Reality system will make the system prohibitively expensive. By contrast, the AR tag recognition and game miniature identification system and process of the present disclosure utilizes an integrated marker as part of the miniature base. Since a unique identifiable integrated marker (or "tag") is connected to each miniature base, visual identification is accurate and simple for the AR system.

The AR tag recognition and game miniature identification system and process of the present disclosure may be comprised of the following elements. This list of possible constituent elements is intended to be exemplary only and it is not intended that this list be used to limit the AR tag recognition and game miniature identification system and process of the present application to just these elements. Persons having ordinary skill in the art relevant to the present disclosure may understand there to be equivalent elements that may be substituted within the present disclosure without changing the essential function or operation of the AR tag recognition and game miniature identification system and process.

1. Determine base size and shape for the game miniature
2. Determine visual identifier to be used
3. Determine marker size and shape on which the visual identifier will be placed
4. Create a combined miniature base of size and shape that includes both base and marker joined together
5. Attach game miniature
6. Create visual identifier
7. Attach visual identifier The various elements of the AR tag recognition and game miniature identification system and process of the present disclosure may be related in the following exemplary fashion. It is not intended to limit the scope or nature of the relationships between the various elements and the following examples are presented as illustrative examples only. The combined miniature base (4) is a single physical miniature base of shape/size equal to the base (1) and marker (3) joined together. On to which the game miniature is attached, in the area of represented by the base, and the visual identifier is attached, in the area of the marker.

The AR tag recognition and game miniature identification system and process of the present disclosure generally works by creating a single base, sized and shaped to accommodate both the game miniature itself and the visual identifier, the game miniature attached to the base can now be easily visually identified by an Augmented Reality system.

To make the AR tag recognition and game miniature identification system and process of the present disclosure, one would create a combined base that is sized and shaped to include a combination of the game miniature base and tag, which when used together, are uniquely identifiable, with the ability to further refine and enhance the visual recognition by the visual identifier. When these are combined, the AR system utilized by the tabletop game will be able to visually identify the attached game miniatures.

In some embodiments, each tag has a shape and a color. In some embodiments, the shape of the tag is one of a circle shape and a particular polygon shape from a plurality of polygon shapes with differing numbers of sides. In some embodiments, the plurality of polygon shapes includes six polygons with differing number of sides. In some embodiments, the plurality of polygon shapes includes a three-sided polygon (triangle), a four-sided polygon (rectangle or square), a five-sided polygon (pentagon), a six-sided polygon (hexagon), a seven-sided polygon (heptagon), and an eight-sided polygon (octagon). In some embodiments, the plurality of polygon shapes includes more than six polygons with differing number of sides.

In some embodiments, the color of the tag is a single color from a plurality of colors. In some embodiments, the plurality of colors include white, red, orange, yellow, green, blue, indigo, violet, and black.

To use the AR tag recognition and game miniature identification system and process of the present disclosure, an appropriately sized miniature base from the tag system is selected. Then a tag is selected. As noted above, each tag has a shape and a color. Alternatively, in some embodiments, a tag may have a shape and color, as well as another visual identifier.

Figure 2:
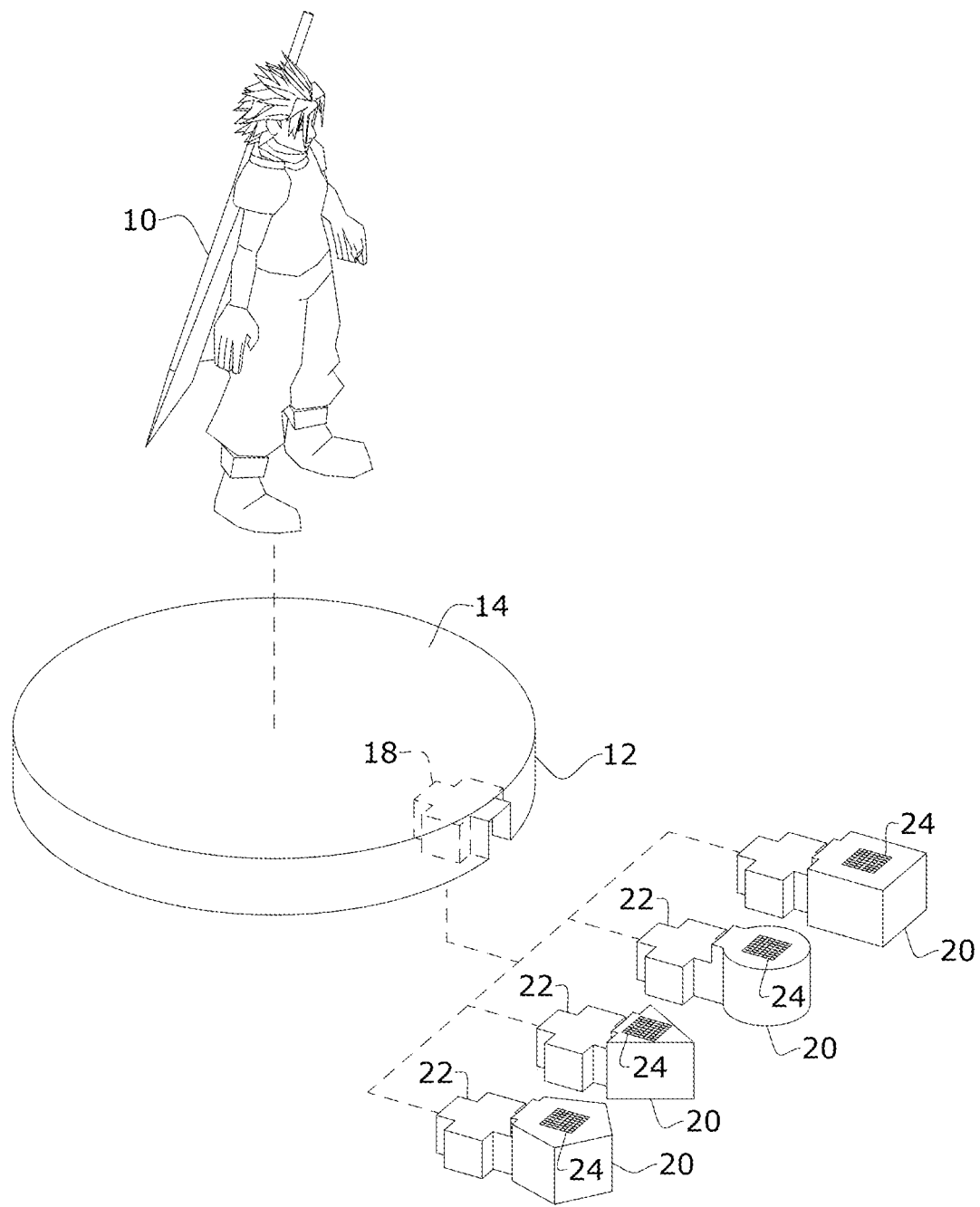
FIG. 2 conceptually illustrates a perspective view of several unique tags that are each able to connect to a miniature base to uniquely identify a game miniature attached to the base as being associated with particular digital characteristics configured for the game miniature in some embodiments.

By way of example, FIG. 2 conceptually illustrates a perspective view of several unique tags 20 that are each able to connect to the miniature base 12 to uniquely identify the game miniature 10 attached to the base 12 as being associated with particular digital characteristics configured for a character being in the role playing game as represented by the game miniature 10.

As shown in this figure, each tag 20 has a click-fit end 22 that fits into a click-fit end receiver 18 of the miniature base 12. Each tag 20 has a visual identifier 24 which may show a character, an icon, a pattern, a symbol, a glyph, or some other unique visual element. Each tag 20 also has a color. In some embodiments, the color of the tag 20 is represented by a color of the visual identifier 24. In some embodiments, the entire tag 20 has a particular color. When the entire tag 20 has the particular color, any visual identifier that may be present provides a different visual element, such as a character, a code, a symbol, a pattern, a glyph, etc.

Generally, a tag 20 is selected to be unique from other tags 20 selected by other players/users for their (other) game miniatures. Thus, a tag 20 is selected according to at least shape and color. In some embodiments, a tag has a particular shape selected from a plurality of supported shapes for tags. The plurality of supported shapes for tags comprises a circle and a plurality of polygon shapes. The plurality of polygon shapes comprise polygons of three-eight sides (referred general as N_GON polygons, where N represents a number of sides of the polygon from 3 to 8). In some embodiments the color of the tag 20 comprises at least one of white, red, orange, yellow, green, blue, indigo, violet, and black. In this way, there are over sixty unique combinations of shape and color for any tag 20. As such, multiple game miniatures with the same characteristics can use the same tag, while game miniatures that are the same can refer to different pre-generated characters (with different characteristics) by using tags that are different in shape and/or color. Also, if a player wishes to replace the mounted game miniature 10 for any reason, the characteristics of the pre-generated character can be re-associated with the replacement game miniature by simply utilizing the same tag 20 that was previously used to uniquely identify the game miniature 10.

Also shown in this figure, the game miniature 10 can be attached to the miniature base 12 (shown by dashed line from below the game miniature 10 down to the top base surface 14 of the miniature base 12). This is normally done with permanent adhesive. The game miniature 10, when mounted to the top base surface 14 of the miniature base 12, is configured to face forward toward the tag 20. In this way, an orientation of the game miniature 10 is easily recognized by the AR recognition performed by the mobile app.

Figure 3:
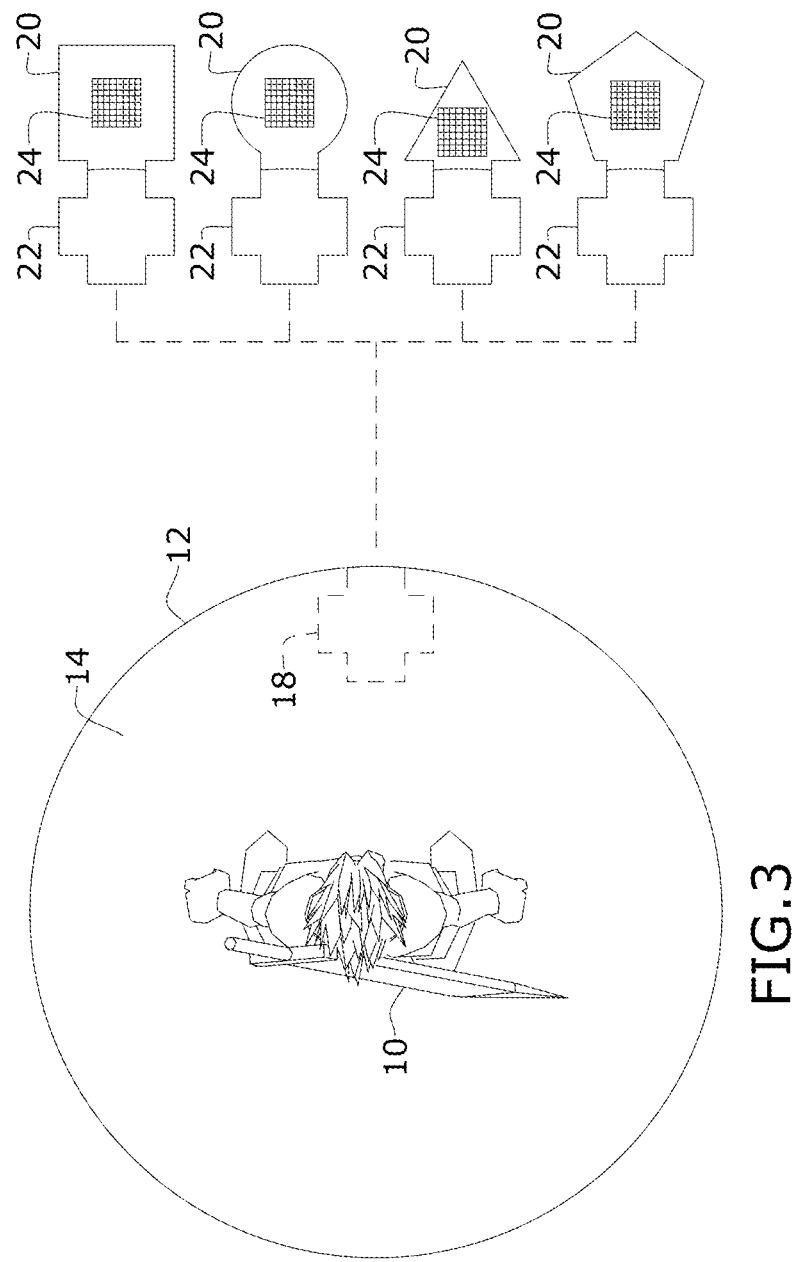
FIG. 3 conceptually illustrates a top view of a click-fit-system that connects the miniature base to any of several unique tags to uniquely identify a game miniature mounted to the miniature base in some embodiments.

Now turning to another example, FIG. 3 conceptually illustrates a top view of a click-fit-system that connects the miniature base 12 to any of several unique tags 20 by way of the click-fit end 22 that fits into a click-fit end receiver 18 of the miniature base 12 to uniquely identify the game miniature 10 mounted to the top base surface 14 of the miniature base 12. As shown here, each tag 20 has a different shape and color, the color either provided over the entire tag 20 or on the visual identifier 24. When color is provided as color of the entire tag 20 itself, the visual identifier 24 can provide another identifying element (e.g., character, glyph, symbol, code, etc.) which increases the ability provide unique combinations for hundreds of different tags.

The tag 20 is inserted into the base using a "click-fit system" that connects the click-fit end 22 into the click-fit end receiver 18 to hold the tag 20 tightly to the miniature base 12, but which allows easy removal with gentle pressure. Again, the game miniature 10 is facing forward toward the position of the tag 20 (when connected via the click-fit-system). It should be noted that the game miniature 10 can be attached to the miniature base 12 before the tag 20 is inserted.

Figure 4:
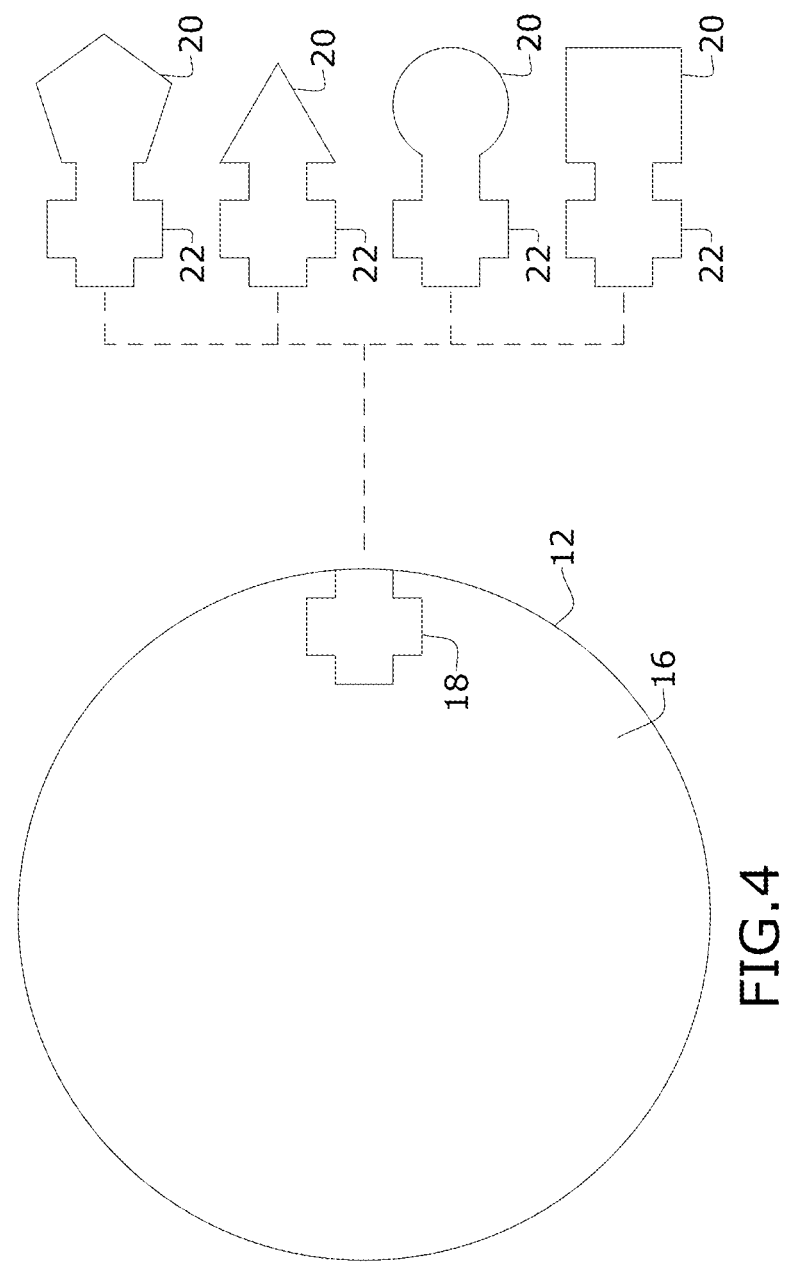
FIG. 4 conceptually illustrates a bottom view of the click-fit-system that connects the miniature base to any of several unique tags to uniquely identify a game miniature mounted to the top of the miniature base in some embodiments.

By way of example, FIG. 4 conceptually illustrates a view of a bottom base surface 16 of the miniature base 12 with the click-fit end receiver 18. As shown, the click-fit end 22 of any tag 20 selected by a player/user fits into the click-fit end receiver 18 from the bottom base surface 16 of the miniature base 12.

Figure 5:
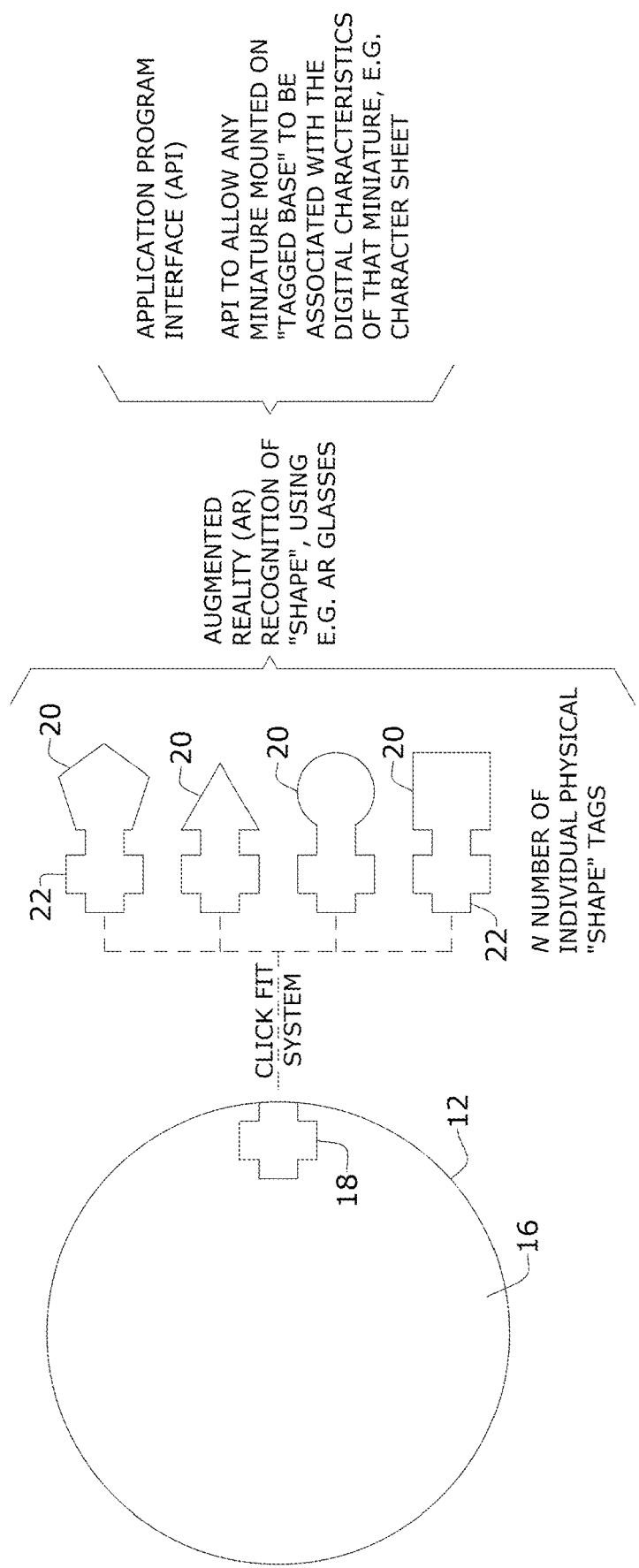
FIG. 5 conceptually illustrates a bottom view of the click-fit-system and several unique tags which, when connected to the miniature base via the click-fit-system, are recognized by an augmented reality (AR) system to uniquely associate a particular game miniature mounted to the top of the miniature base to be associated with digital characteristics configured for that particular game miniature in some embodiments.

Now turning to another example, FIG. 5 conceptually illustrates another view of the bottom base surface 16 of the miniature base 12 with the click-fit end receiver 18 shown to be integral to the click-fit system that allows the tags 20 to securely connect to the miniature base 12 for AR recognition purposes during game play. Also, this figure shows several unique tags which, when connected to the miniature base 12 via the click-fit-system, are recognized by their different respective shapes. In addition to using the color aspect (and/or the visual identifier 24), the augmented reality (AR) system is able to uniquely associate a particular game miniature mounted to the top of the miniature base to be associated with digital characteristics configured for that particular game miniature.

In some embodiments, this is performed by the tabletop role-playing game application utilizing an application programming interface (API) of the AR tag recognition and game miniature identification system. The user/player may, for example, have AR glasses, or may be simply viewing the game miniatures through the AR system on the mobile device or computing device that is running the tabletop role-playing game application. In some embodiments, the API allows any game miniature mounted onto a "tagged base" to be associated with the character and the digital characteristics of the character as stored in the character database, instead of relying on a character sheet and manual determination of turn outcomes. Instead, the tabletop role-playing game application can make automated, realtime determinations that enhances the flow of game play for the tabletop role-playing game. Additionally, any physical object, not just game miniatures, requiring visual identification by an AR system otherwise incapable of identifying that object could use this invention to add a visual identifying marker to said object that would allow identification.

Figure 6:
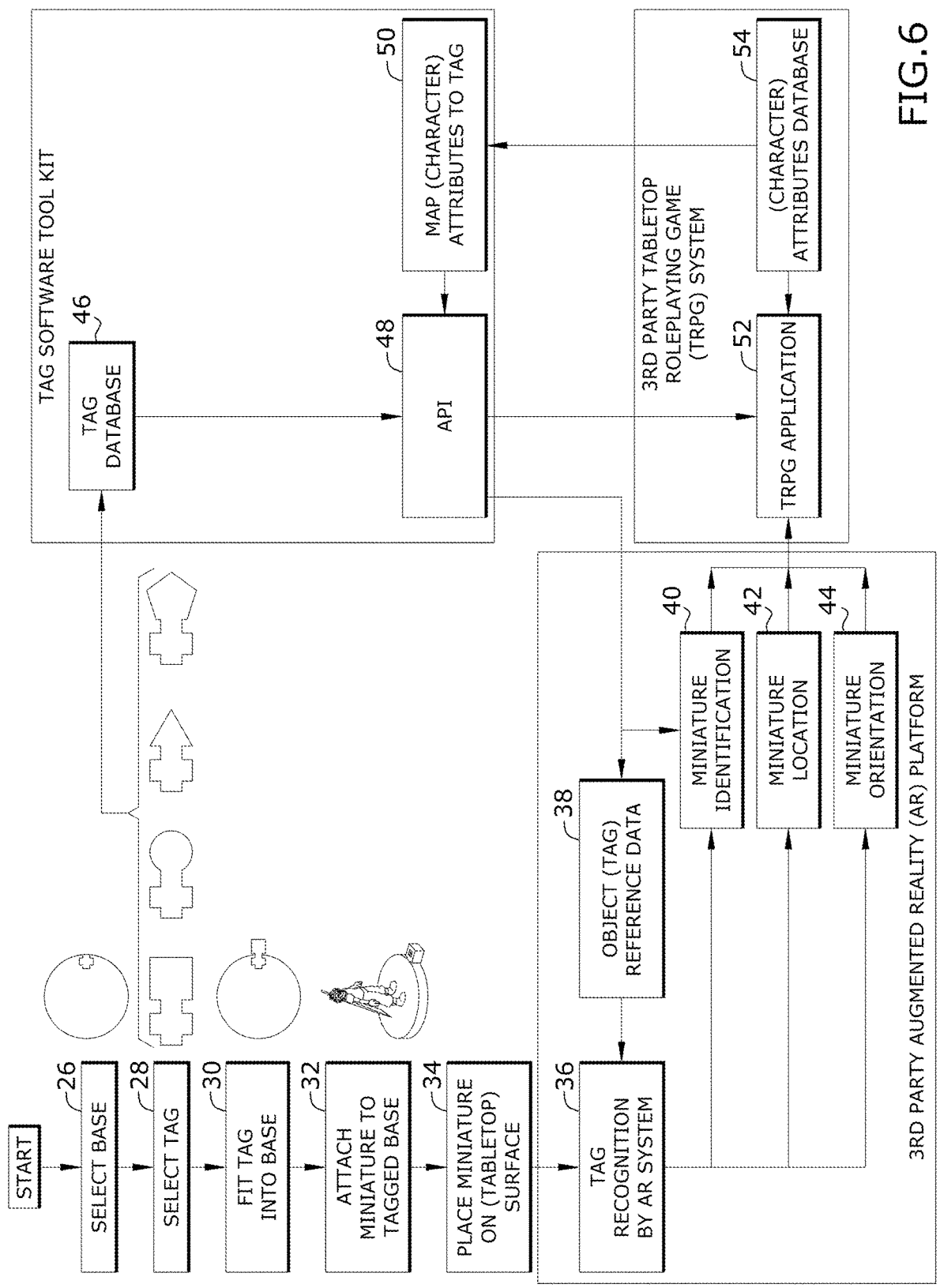
FIG. 6 conceptually illustrates an augmented reality (AR) tag recognition and game miniature identification process in some embodiments.

By way of another example, FIG. 6 conceptually illustrates an augmented reality (AR) tag recognition and game miniature identification process in some embodiments. As shown in this figure, the AR tag recognition and game miniature identification process comprises a plurality of steps which involve an AR platform (e.g., AR glasses, AR program running on a mobile device in connection with the tabletop role-playing game application), a tag software tool kit, and a tabletop role-playing game (TRPG) system.

In some embodiments, the tag software tool kit comprises a tag database, an application programming interface (API), and a map application. In some embodiments, the tag database stores a tag record for each shape and color combination. In some embodiments, each shape/color combination record is associated with a unique database identification (ID). In some embodiments, the database ID (or "record ID") is stored as a concatenated string of characters comprising a name of the shape and a name of the color. In some embodiments, the tag database is encrypted. In some embodiments, each record ID is encrypted before storing in the tag database and is decoded (decrypted) upon authorized retrieval from the tag database. In some embodiments, the tag software tool kit utilizes a secure encryption standard to encrypt the record IDs and any other data stored in the tag database. Examples of secure encryption standards include, without limitation, SHA256, AES256, SHA512, etc.

In some embodiments, the API provides an interface to a tabletop role-playing game application and a character attributes database of the TRPG system. The character attributes database stores character records comprising character attributes for the tabletop role-playing game. In some embodiments, the API also provides an interface to the AR platform (or "AR system"). In some embodiments, the character attributes database is encrypted. In some embodiments, each character record is encrypted before storing in the character attributes database and is decoded (decrypted) upon authorized retrieval from the character attributes database. In some embodiments, the TRPG application utilizes a secure encryption standard to encrypt the character records and any other data stored in the character attributes database.

In some embodiments, the map application associates (i) a character record in the tabletop role-playing game application and the character attributes database of the TRPG system and (ii) an object record from the AR system with a single tag record in the tag database. This yields a relationship chain from the AR object record to the tag record and to the TRPG character record (i.e., AR Object Record <—>Tag Record <—>TRPG Character Record). In this way, when the AR system visually recognizes a tag object it provides the tag record ID along with location and orientation to the TRPG application. The TRPG application can look up the character record based on tag record ID.

In some embodiments, the AR tag recognition and game miniature identification process starts with the user selecting a miniature base (at 26). Different sizes of miniature bases that support various sizes of game miniatures are possible, which may depend on the tabletop role-playing game that is used. Whatever the size of the miniature bases and game miniatures being used, all of the miniature bases have the click-fit system to interlock with a tag.

In some embodiments, the AR tag recognition and game miniature identification process proceeds to the next step at which the user selects a tag (at 28). The tag is selected from one of several uniquely identifiable tags. As noted above, each tag has a click-fit end, which securely connects the tag to the click-fit system of the selected miniature base, and a tag marker end, which has a shape and color, and may also have an additional visual identifier. The shape of the tag marker end is one shape amount a plurality of shapes comprising a circle and several N_GON polygons. The color of the tag marker end is one of several possible colors for the tag. When an additional visual identifier is provided for the tag, it is typically attached, etched, or imprinted on a top surface of the tag marker end. The visual identifier comprises an identifiable mark, such as a code, a character, a number, a symbol, or a pattern.

Next, the AR tag recognition and game miniature identification process of some embodiments continues to the next step at which the user fits the selected tag into the selected miniature base (at 30). In some embodiments, the click-fit system secures the click-fit end of the selected tag into the miniature base. In some embodiments, the click-fit end of the tag fits snugly into the click-fit receiver. In some embodiments, the click-fit system has a snap-lock-and-release mechanism to secure the click-fit end of the tag into the click-fit receiver. In some embodiments, the click-fit receiver is a compartment in which the click-fit end of the tag is placed. In some embodiments, the click-fit receiver has a compartment cover that encloses the click-fit end of the tag to lock the tag in place. In some embodiments, the compartment cover is connected to the bottom base surface of the miniature base and is configured to open and close. While there are several different shapes for the tag marker ends of the tags, the click-fit ends of the tags all have the same shape. In the examples described above, by reference to FIGS. 2-5, the shape of the click-fit end is a cross or plus shape which matches the cross or plus shape of the click-fit receiver compartment. In this way, the tags are interchangeable and the user can choose any shape/color combination for a tag he or she wants.

After the user fits the selected tag into the click-fit receiver of the selected miniature base (at 30), the AR tag recognition and game miniature identification process of some embodiments continues to the next step to attach the game miniature to the tagged miniature base (at 32). As noted above, this step may occur prior to fitting the tag into the miniature base. After the game miniature is adhered to the miniature base and the tag is fit into the click-fit receiver of the miniature base, the AR tag recognition and game miniature identification process proceeds to the next step at which the user places the tagged miniature base with the mounted game miniature onto the game playing surface (at 34). The game playing surface may vary according to user/player needs or availability of a surface, but in order to enable the AR recognition aspects of the AR tag recognition and game miniature identification system to operate, the surface should be one in which hardware and software for the AR platform/system is able to operate. For example, a third party AR platform may have constraints for use that dictate one or more factors in the surface to use (e.g., closest or farthest distance for AR recognition to work). Common surfaces include, without limitation, a tabletop, a desktop, a floor, or another flat surface on which a game map or game plan/mat can be placed (as or if required by the role-playing game).

While the steps for selecting the base (at 26), selecting the tag (at 28), fitting the tag into the base (at 30), attaching the game miniature to the tagged base (at 32), and placing the game miniature on the surface (at 34) are performed by the user, the AR tag recognition and game miniature identification process of some embodiments operates in connection with an AR tag recognition and game miniature identification system that has a tag software toolkit that links to an AR platform (such as a third party AR platform or an integrated platform) and a tabletop role-playing game (TRPG) system (such as a third party TRPG system or an integrated TRPG system). In some embodiments, the tag software toolkit comprises a tag database (at 46) and an application programming interface (API) (at 48). In some embodiments, the tag software toolkit identifies the tag in the tag database (at 46) when the user selects the tag (at 28) and performs an operation to identify the tag (e.g., by scanning the tag) in the tag database (at 46). Tag reference data for the tag identified in the tag database (at 46) is provided to the API (at 48), which is able to transmit the tag reference data to the AR platform and the TRPG system. The tag software toolkit also maps character attributes to the tag (at 50) which was selected (at 28) by the user.

In this way, after the user places the game miniature on the surface (at 34), the AR tag recognition and game miniature identification process of some embodiments is able to perform tag recognition (at 36) by way of the AR platform, which obtains the tag reference data (at 38) from the API (at 48). After the tag reference data is received (at 38), the AR tag recognition and game miniature identification process utilizes the AR platform to determine the identity (at 40), the location (42), and the orientation (at 44) of the game miniature. As described above, the tag is uniquely identifiable by the visual recognition system of the AR platform and distinguishable from other tags by a combination of the particular shape and the particular color for the tag marker end of the tag selected by the user (at 28). Given the tag reference data (at 38), the visual recognition system of the AR platform can identify the game miniature (at 40). The visual recognition system of the AR platform is also able to identify the location of the game miniature due to its placement at a particular game map location. For example, the game map or game surface of the tabletop role-playing game may provide visual elements, such as a grid pattern of lines or visual markers along a perimeter of a playable area that can be resolved along two axes, from which the AR platform can identify the location of the game miniature (at 42). Also, the front-facing orientation of the game miniature mounted to the miniature base is related to the position of the click-fit system at which the tag attaches to the miniature base. Also, the front-facing orientation of the game miniature mounted to the miniature base is the same orientation that faces the click-fit system position at which the tag attaches to the miniature base. In this way, the visual recognition system of the AR platform can quickly determine the orientation of the game miniature (at 44) as placed on the surface.

After the identity, location, and orientation of the game miniature is obtained via AR recognition, the AR tag recognition and game miniature identification process of some embodiments transmits this information to a tabletop role-playing game application (at 52) of the TRPG system. In some embodiments, the TRPG application (at 52) links the identity, location, and orientation of the game miniature to corresponding character attributes retrieved from a character attributes database (at 54) of the TRPG system. The retrieved character attributes are first able to be identified in the character attributes database by the mapping of the character attributes to the tag (at 50) that was performed by way of the tag software tool kit after the user selected the tag (at 28). In this way, if the user selects a new or different tag, it is possible to update the tag database (at 46) and map the user's pre-generated character attributes to the newly selected, different tag. Similarly, if the user changes the game miniature, but wishes to keep using the same characteristics as were associated with the old game miniature, the user only needs to remove the tag from the old miniature base and place into a new miniature base on which the new game miniature is mounted (or, alternatively, detach the old game miniature from the old base and remount the new miniature to the base, utilizing the same tag as before).

Referring back to the conventional TRPG example described in the background section of this specification, in which Character A (played by Player A) wants to shoot Character B (played by Player B). Conventionally, the way to resolve this encounter is to manually compare the characteristics of both Character A and Character B (while also considering any other factors, e.g., environmental factors that may impact the encounter). Yet, manually resolving this encounter is typically slow and takes away from game play (players consult character sheets, reference rule books, perform visual observation, allow for game master (or referee) adjudication, etc.).

By contrast, the AR tag recognition and game miniature identification system and process is able to resolve the encounter between Character A and Character B with relative ease. Specifically, both players select uniquely identifiable tags to attach to their miniature bases so that when AR recognition is performed, the character records for Character A and Character B can be loaded and reviewed automatically. For instance, Player A may attach a game miniature to a miniature base with a uniquely identifiable tag that is colored white and shaped as a circle ("CIRCLE-WHITE tag"), while Player B attaches their miniature to a miniature base with a different uniquely identifiable tag, which is colored black and shaped as a square ("SQUARE-BLACK tag"). Additionally, the TRPG application includes a character record for Character A and a character record for Character B.

As noted above, the API connects the Tag Software Tool Kit to the TRPG Application, which allows the map application to map the CIRCLE-WHITE tag (recognized by the AR system) to Character A. Similarly, the map application maps the SQUARE-BLACK tag (also recognized by the AR system) to Character B.

The map application is used to map the CIRCLE-WHITE tag to Object X and the SQUARE-BLACK tag to Object Y. Since the API also connects the Tag Software Tool Kit to the AR system, the Object X and Object Y (tag) reference data can be automatically applied by the AR system.

Thus, when Player A declares that Character A shoots Character B, a sequence of steps proceeds in which (i) the TRPG system requests location/orientation of the CIRCLE-WHITE tag and the SQUARE-BLACK tag, (ii) the AR system returns the information for Object X and Object Y, (iii) the TRPG system then calculates the relative distance between Character A and Character B based on the location information of each game miniature, and (iv) the TRPG application finally calculates the outcome based on the character attributes for Character A and the character attributes for Character B, their relative distance, and their respective orientations.

As a simple case, the chance of success (outcome) would vary depending on character attributes for Character A which would impact shooting (e.g., a type of gun, a personal dexterity or precision competency level or value, etc.), factors related to Character B (e.g., whether oriented toward or away from Character A), other environmental factors, such as distance (e.g., chance of success diminishing with greater distance). It should be noted that the AR system, through map image recognition that is not related directly to this patent, could provide additional information to the TRPG system to be used in the determination of outcome. In this example, if Character B is positioned with some form of intervening cover (e.g., furniture, vehicle, or, terrain) then the chance of success of Character A shooting them would be reduced.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the phrase "tabletop role-playing game application" and the terms "program", "script", "application", "function", "web app" or "app", and "feature" (referred to below as "software") are meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
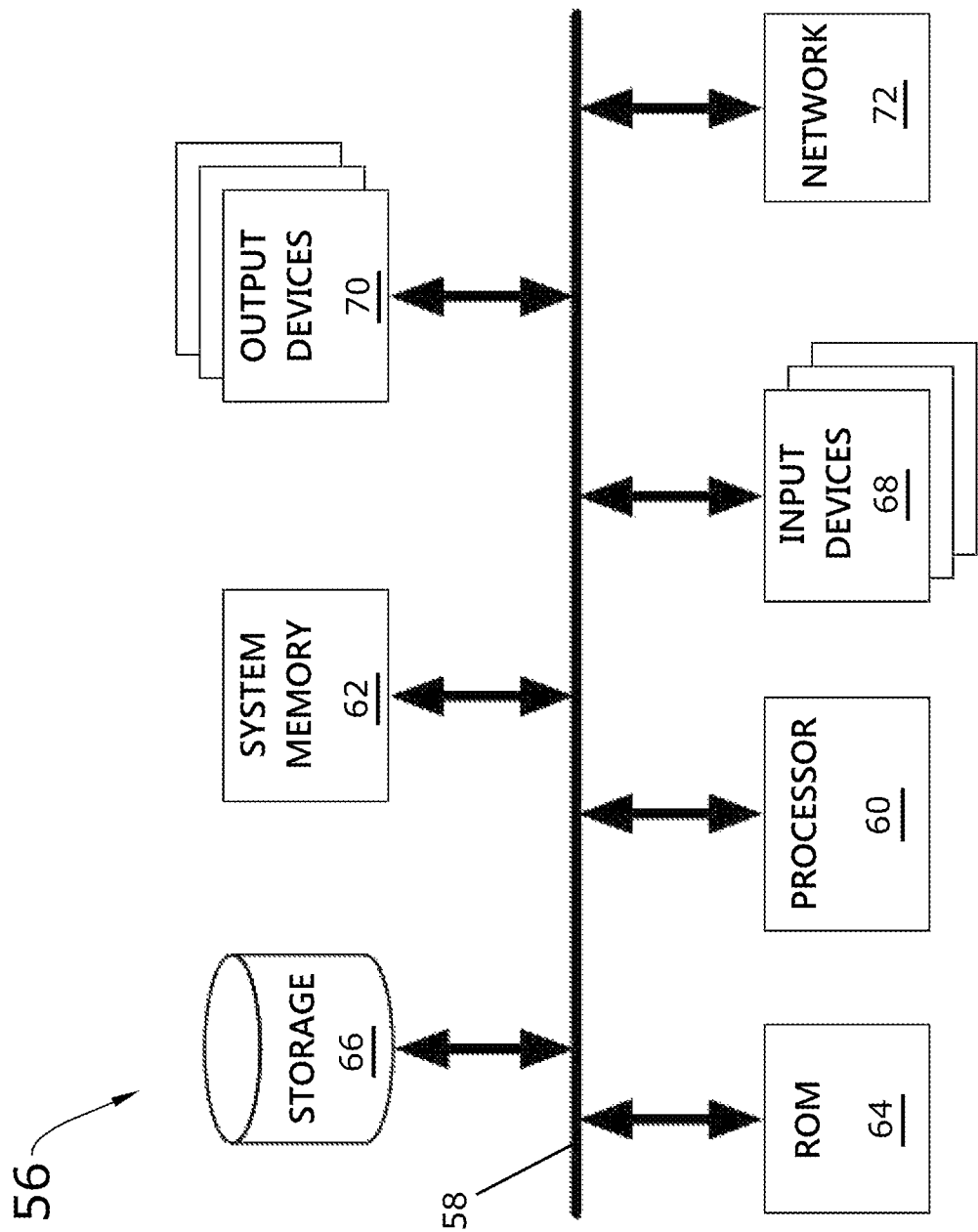
FIG. 7 conceptually illustrates an electronic system with which some embodiments of the invention are implemented.

FIG. 7 conceptually illustrates an electronic system 56 with which some embodiments of the invention are implemented. The electronic system 56 may be a computer, phone (cell phone, mobile phone, smartphone, etc.), PDA (iPod, other handheld computing device, etc.), or any other sort of electronic device or computing device. Such an electronic system includes various types of computer readable media and interfaces for various other types of computer readable media. Electronic system 56 includes a bus 58, processing unit(s) 60, a system memory 62, a read-only memory 64, a permanent storage device 66, input devices 68, output devices 70, and a network 72.

The bus 58 collectively represents all system, peripheral, and chipset buses that communicatively connect the numerous internal devices of the electronic system 56. For instance, the bus 58 communicatively connects the processing unit(s) 60 with the read-only memory 64, the system memory 62, and the permanent storage device 66.

From these various memory units, the processing unit(s) 60 retrieves instructions to execute and data to process in order to execute the processes of the invention. The processing unit(s) may be a single processor or a multi-core processor in different embodiments.

The read-only-memory (ROM) 64 stores static data and instructions that are needed by the processing unit(s) 60 and other modules of the electronic system. The permanent storage device 66, on the other hand, is a read-and-write memory device. This device is a non-volatile memory unit that stores instructions and data even when the electronic system 56 is off. Some embodiments of the invention use a mass-storage device (such as a magnetic or optical disk and its corresponding disk drive) as the permanent storage device 66.

Other embodiments use a removable storage device (such as a USB driver or a flash drive) as the permanent storage device 66. Like the permanent storage device 66, the system memory 62 is a read-and-write memory device. However, unlike storage device 66, the system memory 62 is a volatile read-and-write memory, such as a random access memory. The system memory 62 stores some of the instructions and data that the processor needs at runtime. In some embodiments, the invention's processes are stored in the system memory 62, the permanent storage device 66, and/or the read-only memory 64. For example, the various memory units include instructions for processing appearance alterations of displayable characters in accordance with some embodiments. From these various memory units, the processing unit(s) 60 retrieves instructions to execute and data to process in order to execute the processes of some embodiments.

The bus 58 also connects to the input and output devices 68 and 70. The input devices enable the user to communicate information and select commands to the electronic system. The input devices 68 include alphanumeric keyboards and pointing devices (also called "cursor control devices"). The output devices 70 display images generated by the electronic system 56. The output devices 70 include printers and display devices, such as liquid crystal displays (LCD) or organic light emitting diode (OLED) displays. Some embodiments include devices such as a touchscreen that functions as both input and output devices.

Finally, as shown in FIG. 7, bus 58 also couples electronic system 56 to a network 72 through a network adapter (not shown). In this manner, the computer can be a part of a network of computers (such as a local area network ("LAN"), a wide area network ("WAN"), or an intranet), or a network of networks (such as the Internet). Any or all components of electronic system 56 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, disc media (CDs, DVDs, Blu-Ray® discs, ultra density optical discs, etc.), flash memory (e.g., SD cards, mini-SD cards, micro-SD cards, etc.), magnetic and/or solid state hard drives, and/or any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 6 conceptually illustrates a process in which the specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. An augmented reality (AR) tag recognition and game miniature identification system that uniquely identifies game miniatures and character attributes that correspond to the game miniatures in a tabletop role-playing game, the AR tag recognition and game miniature identification system comprising:
    a miniature base;
    a click-fit system comprising a click-fit receiver that is positioned along a bottom surface of the miniature base;
    a game miniature mounted to a top surface of the miniature base, said game miniature mounted with a front-facing orientation toward the click-fit system;
    a tag that attaches to the miniature base by way of the click-fit system;
    a character attribute database that stores pre-generated character attributes provided by a particular player of the tabletop role-playing game and associated with the tag that attaches to the miniature base;
    an augmented reality (AR) system comprising a visual recognition system that performs AR recognition of the tag to uniquely identify the game miniature mounted to the miniature base as corresponding to the pre-generated character attributes stored in the character attribute database; and
    a tag software tool kit comprising a tag database and an application programming interface (API), wherein the tag database stores tag reference data of the tag attached to the miniature base, wherein the API (i) maps the pre-generated character attributes provided by the particular player of the tabletop role-playing game to the tag reference data and (ii) provides the tag reference data to the AR system to determine game miniature details after placement of the game miniature by the particular player on a surface of the tabletop role-playing game, wherein the game miniature details comprise miniature identification, miniature location, and miniature orientation.

2. The AR tag recognition and game miniature identification system of claim 1, wherein the tag comprises a shape and a color.

3. The AR tag recognition and game miniature identification system of claim 2, wherein a combination of the shape and the color is distinct from combinations of shapes and colors of other tags that attach to and uniquely identify other game miniatures mounted to other miniature bases used by other players in the tabletop role-playing game.

4. The AR tag recognition and game miniature identification system of claim 2, wherein the tag is uniquely identifiable, wherein the uniquely identifiable tag comprises a click-fit end and a tag marker end.

5. The AR tag recognition and game miniature identification system of claim 4, wherein the click-fit end of the uniquely identifiable tag is configured to attach to the click-fit receiver.

6. The AR tag recognition and game miniature identification system of claim 4, wherein the color is a particular color selected from a plurality of tag colors and the shape is a particular shape selected from a plurality of tag shapes.

7. The AR tag recognition and game miniature identification system of claim 6, wherein the particular shape and the particular color are visible to the visual recognition system of the AR system on the tag marker end of the tag.

* * * * *